United States Patent
Altug Yanik et al.

(10) Patent No.: US 11,187,652 B2
(45) Date of Patent: Nov. 30, 2021

(54) METHOD AND SPECTROMETER APPARATUS FOR INVESTIGATING AN INFRARED ABSORPTION OF A SAMPLE

(71) Applicant: ECOLE POLYTECHNIQUE FEDERALE DE LAUSANNE (EPFL), Lausanne (CH)

(72) Inventors: Hatice Altug Yanik, Mex VD (CH); Andreas Tittl, Munich (DE); Aleksandrs Leitis, Lausanne (CH)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 17/050,650

(22) PCT Filed: Apr. 27, 2018

(86) PCT No.: PCT/EP2018/060896
§ 371 (c)(1),
(2) Date: Oct. 26, 2020

(87) PCT Pub. No.: WO2019/206430
PCT Pub. Date: Oct. 31, 2019

(65) Prior Publication Data
US 2021/0239605 A1 Aug. 5, 2021

Related U.S. Application Data

(63) Continuation of application No. PCT/EP2018/060896, filed on Apr. 27, 2018.

(51) Int. Cl.
*G01J 3/45* (2006.01)
*G01N 21/35* (2014.01)
(Continued)

(52) U.S. Cl.
CPC ............ *G01N 21/35* (2013.01); *G01J 3/0256* (2013.01); *G02B 1/002* (2013.01); *G02B 5/008* (2013.01);
(Continued)

(58) Field of Classification Search
CPC ...... G01J 3/453; G01J 3/02; G01J 3/45; G01J 3/4535; G01B 9/02
(Continued)

(56) References Cited

U.S. PATENT DOCUMENTS 9,476,770 B1 * 10/2016 Green ................ G01N 33/0027
2011/0080579 A1 * 4/2011 Pipino ................ G01N 21/7746
356/301

(Continued)

OTHER PUBLICATIONS

Arbabi et al., "Dielectric metasurfaces for complete control of phase and polarization with subwavelength spatial resolution and high transmission", Nature Nanotechnology, vol. 10, pp. 937-944 (2015).
(Continued)

*Primary Examiner* — Md M Rahman
(74) *Attorney, Agent, or Firm* — Caesar Rivise, PC

(57) ABSTRACT

A method of investigating a sample (1) having an absorption within an infrared spectral range of interest, comprises the steps of creating measuring light (2) with a light source device (10), wherein the measuring light (2) includes wavelengths covering the infrared spectral range, directing the measuring light (2) through the sample (1) to a detector device (20) with a plurality of detector units (21), each of which comprising an infrared sensitive sensor section (22) and an associated metamaterial resonator section (23) having a specific spectral resonance line (3), wherein the spectral resonance lines (3) of the resonator sections (23) have different frequencies within the infrared spectral range, wherein the measuring light (2) is transmitted through the sample (1) to the resonator sections (23) and subsequently
(Continued)

sensed by the sensor sections (22), wherein an output of each of the sensor sections (22) depends on the absorption of the sample (1) at the frequency of the spectral resonance line (3) of the associated resonator section (23), and providing at least one absorption characteristic of the sample (1) on the basis of the output of the sensor sections (22), wherein the sample (1) is arranged for providing near field coupling of electronic states of the sample (1) and photonic resonator states of the resonator sections (23), wherein, for each of the resonator sections (23), a resonance line attenuation is created, which is determined by a complex refractive index of the sample (1) at the frequency of the spectral resonance line (3) of the resonator section (23), and the output of each of the sensor sections (22) is determined by the resonance line attenuation of the associated resonator section (23). Furthermore, a spectrometer apparatus (100) for investigating a sample (1) is described, which has an absorption within an infrared spectral range of interest.

42 Claims, 4 Drawing Sheets

(51) Int. Cl.
    G01J 3/02    (2006.01)
    G02B 5/00    (2006.01)
    G02B 1/00    (2006.01)
    G01J 3/12    (2006.01)
    G01J 3/28    (2006.01)
(52) U.S. Cl.
    CPC ............... G01J 2003/1213 (2013.01); G01J 2003/2806 (2013.01)
(58) Field of Classification Search
    USPC ........................................................ 356/451
    See application file for complete search history.

(56) References Cited

U.S. PATENT DOCUMENTS

| | | |
|---|---|---|
| 2015/0063739 A1 | 3/2015 | Long et al. |
| 2015/0144770 A1 | 5/2015 | Choi |
| 2015/0211922 A1 | 7/2015 | Yu |
| 2017/0063039 A1 | 3/2017 | Sinclair et al. |

OTHER PUBLICATIONS

Baker et al., "Using Fourier transform IR spectroscopy to analyze biological materials", Nature Protocols, vol. 9, No. 8, pp. 1771-1791 (2014).
Bassan et al., "Large scale infrared imaging of tissue micro arrays (TMAs) using a tunable Quantum Cascade Laser (QCL) based microscope", Analyst, vol. 139, pp. 3856-3859 (2014).
Caldarola et al., "Non-plasmonic nanoantennas for surface enhanced spectroscopies with ultra-low heat conversion", Nature Communications, 6:7915, pp. 1-8 (2015).
Chen et al., "Dual-Band Perfect Absorber for Multispectral Plasmon-Enhanced Infrared Spectroscopy", ACS Nano, vol. 6, No. 9, pp. 7998-8006 (2012).
Decker et al., "High-Efficiency Dielectric Huygens' Surfaces", Adv. Optical Mater., vol. 3, pp. 813-820 (2015).
Dregely et al., "Vibrational near-field mapping of planar and buried three-dimensional plasmonic nanostructures", Mature Communications, 4:2237, pp. 1-9 (2013).
Grant et al., "CMOS compatible metamaterial absorbers for hyperspectral medium wave infrared imaging and sensing applications", Optics Express, vol. 26, No. 8, pp. 10408-10420 (2018).
Hinton et al., "Reducing the Dimensionality of Data with Neural Networks", Science, vol. 313, pp. 504-507 (2006).
Huck et al., "Surface-Enhanced Infrared Spectroscopy Using Nanometer-Sized Gaps", ACS Nano, vol. 8, No. 5, pp. 4908-4914 (2014).
International Search Report for PCT/EP2018/060896, dated Aug. 7, 2018.
Khalil et al., Characterization of MEMS FTIR spectrometer, Proc. of SPIE, vol. 7930, pp. 79300J-1-10 (2011).
Khorasaninejad et al., "Metalenses at visible wavelengths: Diffraction-limited focusing and subwavelength resolution imaging", Applied Optics, vol. 352, No. 6290, pp. 1190-1194.
Kita et al., On-Chip Infrared Spectroscopic Sensing: Redefining the Benefits of Scaling, IEEE Journal of Selected Topics in Quantim Electronics, vol. 23, No. 2, pp. 1-10 (2017).
LeCun et al., "Deep learning", Nature, vol. 521, pp. 436-444 (2015).
Leitis et al., "Angle-multiplexed all-dielectric metasurfaces for broadband molecular fingerprint retrieval", Sci. Adv., vol. 5, pp. 1-8 (2019).
Limaj, et al. "Infrared Plasmonic Biosensor for Real-Time and Label-Free Monitoring of Lipid Membranes", Nano Lett., vol. 16, pp. 1502-1508 (2016).
Lin et al., "Dielectric gradient metasurface optical elements", Science, vol. 345, pp. 298-302 (2014).
Lin et al., "Integrated photonics for infrared spectrocopic sensing", Proc. of SPIE, vol. 10249, pp. 10290G-1-12 (2017).
Neubrech et al., "Surface-Enhanced Infrared Spectroscopy Using Resonant Nanoantennas", Chem, Rev., vol. 117, pp. 5110-5145 (2017).
Niklaus et al., "MEMS-based uncooled infrared bolometer arrays: a review" Proc. of SPIE, vol. 6836, pp. 68360D-1-15 (2007).
Rodrigo et al., "Mid-infrared plasmonic biosensing with graphene", Science, vol. 6244, pp. 165-168 (2015).
Sui et al., "High Q-Factor Resonance in a Symmetric Array of All-Dielectric Bars", Appl. Sci., vol. 8, pp. 1-8 (2018).
Tittl et al., "Imaging-based molecular barcoding with pixelated dielectric metasurfaces", Science, vol. 360, pp. 1105-1109 (2018).
Tittl et al., "Imaging-based molecular barcoding with pixelated dielectric metasurfaces", Supplementary Materials, Science, vol. 360, 24 pages (2018).
Tittl et al., "Metasurface-Based Molecular Biosensing Aided by Artificial Intelligence", Angew. Chem. Int. Ed., vol. 58, pp. 14810-14822 (2019).
Wu et al., "Fano-resonant asymmetric metamaterials for ultrasensitive spectroscopy and identification of molecular monolayers", Nature Materials, vol. 11, pp. 69-75 (2012).
Wu et al., "Spectrally selective chiral silicon metasurfaces based on infrared Fano resonances", Nature Materials, vol. 11, pp. 69-75 (2012).
Yang et al., "All-dielectric metasurface analogue of electromagnetically induced transparency", Nature Communications, 5:5753 (2014).

\* cited by examiner

METHOD AND SPECTROMETER APPARATUS FOR INVESTIGATING AN INFRARED ABSORPTION OF A SAMPLE

CROSS-REFERENCE TO RELATED APPLICATIONS

This application is a U.S. National Phase Application of PCT/EP2018/060896, filed Apr. 27, 2018, the contents of which application are incorporated herein by reference in their entireties for all purposes.

FIELD OF THE INVENTION

The present invention relates to a method of investigating a sample having an absorption within an infrared spectral range of interest, in particular to a method of measuring infrared absorption and/or detecting substances based on an infrared absorption thereof. Furthermore, the invention relates to a spectrometer apparatus for investigating a sample having an infrared absorption. The invention employs a pixelated metasurface comprising metamaterial resonator sections with specific spectral resonance lines at different frequencies within the infrared spectral range for spectrally selective sensing spectral features of the sample. Applications of the invention are available e. g. in spectroscopy, substance detection, environmental monitoring, and/or chemical or biochemical analyses.

BACKGROUND OF THE INVENTION

In the present specification, reference is made to the following prior art illustrating technical background of the invention and related techniques:
[1] US 2017/0063039 A1;
[2] A. Arbabi et al. in Nat Nanotechnol. 10, 937-943 (2015);
[3] M. Decker et al. in Adv. Opt. Mater. 3, 813-820 (2015);
[4] M. Khorasaninejad et al. in Science. 352, 1190-1194 (2016);
[5] D. Lin et al. in Science. 345, 298-302 (2014);
[6] M. Caldarola et al. in Nat. Commun. 6, 7915 (2015);
[7] Y. Yang et al. in Nat. Commun. 5, 5753 (2014);
[8] C. Wu et al. in Nat. Commun. 5, 3892 (2014);
[9] D. Dregely et al. in Nat. Commun. 4, 2237 (2013);
[10] O. Limaj et al. in Nano Lett. 16, 1502-1508 (2016);
[11] C. Huck et al. in ACS Nano. 8, 4908-4914 (2014);
[12] F. Neubrech et al. in Chem. Rev. 117, 5110-5145 (2017);
[13] US 2015/144770 A1;
[14] US 2015/211922 A1;
[15] Kai Chen et al. in ACS Nano, 7998-8006 (2012);
[16] C. Wu et al. in Nat. Mater. 11, 69-75 (2012);
[17] H. Lin et al. in Proc. SPIE 10249, Integrated Photonics: Materials, Devices, and Applications IV (2017), p. 102490G;
[18] M. J. Baker et al. in Nat. Protoc. 9, 1771-1791 (2014);
[19] D. Khalil et al. in Proc. SPIE 7930, MOEMS and Miniaturized Systems X (2011), p. 79300J;
[20] D. M. Kita et al. in IEEE J. Sel. Top. Quantum Electron. 23, 340-349 (2017);
[21] F. Niklaus et al. in Proc. SPIE 6836, MEMS/MOEMS Technologies and Applications III (2008), p. 68360D;
[22] G. E. Hinton et al. in Science. 313, 504-507 (2006);
[23] Y. LeCun et al. in Nature. 521, 436-444 (2015);
[24] D. Rodrigo et al. in Science. 349, 165-168 (2015); and
[25] P. Bassan et al. in Analyst. 139, 3856-3859 (2014).

Electromagnetic metamaterials, in particular electromagnetic metasurfaces, comprise artificial materials which are capable of modulating the behaviors of electromagnetic waves by providing boundary conditions within the metamaterial. A metasurface comprises a material with a layer-shaped configuration (two-dimensional configuration), wherein the boundary conditions are provided by structures (or: resonators, resonator elements), in particular wavelength-scaled or subwavelength-scaled structures with varying refractive indices, arranged along the metasurface (see e. g. [1]). Metasurfaces provide unique capabilities for controlling the propagation and localization of light, applications including generalized wave front control ([2], [3]), ultra-thin metalenses ([4], [5]), and efficient light concentration ([6], [7]). Nanostructured dielectric resonator elements have emerged as essential building blocks for metasurface applications due to their low intrinsic loss, CMOS compatibility, and high quality factor resonances. High 0-factor resonances can be used to enhance a wide range of physical processes and are crucial for optical sensing approaches ([8]).

It is generally known that spectroscopy in the infrared spectral range, in particular the mid-infrared spectral range, is especially important for a label-free and unambiguous identification of molecular species due to the presence of characteristic molecular absorption signatures (or: molecular fingerprints), which originate from the intrinsic vibrational modes of the molecular bonds. Mid-infrared spectroscopy enables chemical specificity unique to this spectral range. However, sensitivity of conventional mid-IR spectroscopy is limited when detecting signals from nanometer-scale volumes [9], biological membranes [10], or low numbers of surface-adsorbed molecules [11]. Surface-enhanced infrared spectroscopy (SEIRA spectroscopy) using resonant metal nanoantennas represents an approach which overcomes this sensitivity limitation [12]. SEIRA spectroscopy exploits the signal enhancement exerted by the plasmon resonance of nano-structured metal thin films. However, as a disadvantage, SEIRA measurements are fundamentally limited by broad linewidths associated with the intrinsic damping of the metal.

Another application of plasmonic nanofilters is provided by a multispectral imager with a hybrid double layer filter array as described in [13]. Each plasmonic nanofilter of the filter array has a different spectral transmission line defining a pass band to an associated detector pixel. By illuminating the filter array along a light path including a sample, an absorption spectrum of the sample can be derived from the detector pixels. This technique has limitations in terms of a restriction to an operation in the visible spectral range, so that vibrational absorption spectra cannot be measured, and low sensitivity. A similar compact optical spectrometer including a multispectral filter array over a broadband imaging chip is described in [14], wherein the individual filters are provided by optical structures affecting the propagation of light. Again, there is a disadvantage in terms of low sensitivity.

Generally, there is a need for miniaturization in mid-IR spectroscopy, with the ultimate goal of realizing a mid-IR "sensor-on-a-chip" platform, which combines high sensitivity, portability, robustness, and ease of use [17]. However, such miniaturization is a particular challenge in the mid-IR, due to the need for Fourier-transform IR (FTIR) spectrometers or frequency scanning laser sources [18]. To address this, approaches based on microelectromechanical systems (MEMS) and optical waveguides have been explored [19] [20], but still require moving parts or complex coupling optics.

Objective of the Invention

It is an objective of the invention to provide an improved method of investigating a sample having an infrared absorption, being capable of avoiding limitations and disadvantages of conventional techniques. In particular, the method is to be capable of a spectroscopic characterization of the sample in an infrared spectral range of interest with increased sensitivity, reliability and/or reproducibility. Furthermore, the method is to be capable of sensing vibrational spectra of a sample, in particular biological samples. It is a further objective of the invention to provide an improved spectrometer apparatus for investigating a sample, being capable of avoiding limitations and disadvantages of conventional techniques. In particular, the spectrometer apparatus is to be capable of a spectroscopic characterization of the sample in the infrared spectral range with increased sensitivity, reliability and/or reproducibility, and/or it should be miniaturizable and/or have a configuration with reduced complexity.

SUMMARY OF THE INVENTION

These objectives are solved by a method and/or a spectrometer apparatus of the invention.

According to a first general aspect of the invention, the above objective is solved by a method of spectrometrically investigating a sample having an absorption within an infrared spectral range of interest (or: target frequency range), comprising the following steps. Measuring light is generated with a light source device, wherein the measuring light comprises wavelengths covering the infrared spectral range. The infrared spectral range of interest preferably is a spectral range covering multiple vibrational absorption bands of molecules, in particular organic molecules. The measuring light, which may comprise continuous or pulsed light, is directed through the sample to a detector device.

The measuring light preferably has a broadband characteristic. Preferably, it covers the spectral range of interest comprising or being included in a frequency interval from 7000 $cm^{-1}$ to 650 $cm^{-1}$, in particular from 900 $cm^{-1}$ to 1800 $cm^{-1}$. With a particularly preferred example, the spectral range of interest covers a frequency interval from 1350 $cm^{-1}$ to 1750 $cm^{-1}$. Advantageously, this frequency interval contains a multitude of characteristic molecular stretching/bending vibrations found in hydrocarbons and amino acids, so that advantages for detecting and differentiating the absorption signatures of biomolecules, environmental pollutants, and polymeric species, among others can be obtained. The latter spectral range covers e. g. the amide band spectral region around 1600 $cm^{-1}$, including the amide I and II vibrational bands located at around 1660 $cm^{-1}$ and 1550 $cm^{-1}$, respectively. However, the invention is not limited to these specific wavenumbers. In particular, resonances over the entire mid-IR molecular absorption band region can be investigated.

The detector device includes a plurality (at least two) of detector units (or: metasurface detector pixels). Each detector unit comprises an infrared sensitive sensor section, each with an associated dielectric, especially non-metallic metamaterial resonator section, in particular a metasurface resonator section, with a predetermined spectral resonance line within the infrared spectral range, wherein the frequency of the spectral resonance line differs from the frequency of the spectral resonance line of at least one other resonator section. The sensor section and the associated metamaterial resonator section are arranged such that measuring light being reflected and/or transmitted by the resonator section is collected by the associated sensor section. In general, the metamaterial, in particular the metasurface, of each resonator section is an artificial material with wavelength sized or sub-wavelength sized building blocks (or: resonator elements), which is configured to manipulate transmitted and/or reflected light amplitude and/or phase and to exhibit the spectral resonance line. Thus, the term "resonator section" refers to a two-dimensional arrangement of resonator elements being configured for providing the spectral resonance line of the resonator section.

Preferably, each metamaterial resonator section has one single specific spectral resonance line (resonance frequency or wavelength) within the infrared spectral range of interest. This preferred configuration of the resonator section with the single spectral resonance line means that the transmission spectrum of the resonator section has one single maximum, preferably one single resonance in the infrared spectral range considered, with a frequency difference relative to the spectral resonance line of at least one or all of the other resonator section(s). The resonator section may have further resonances outside the infrared spectral range of interest. The resonance wavelengths of individual resonator sections are adjusted independently (e. g. by setting the material, size and/or shape of the resonator section) to cover the target frequency range, such as e. g. the $CH_2$ or amide absorption bands which are located mainly in the fingerprint Mid-IR spectral region. Example arrays of usable dielectric resonator elements providing metasurfaces with sufficiently sharp resonances suitable for use in the invention include resonator elements as described e. g. in [1], [7] and [8].

The measuring light is transmitted through the sample to all resonator sections simultaneously and subsequently sensed by the associated sensor sections. The term "sensor sections" refers to any mid infrared sensitive element being configured for providing an output signal representing an amplitude of mid infrared light received. The output (or: output signal) of each of the sensor sections depends on the absorption of the sample at the frequency of the spectral resonance line of the associated resonator section. At least one absorption characteristic of the sample is provided (or: reconstructed) on the basis of the output of the sensor sections.

According to the invention, the sample is arranged such that near field coupling of electronic states of the sample and photonic resonator states of the resonator sections is obtained. For each of the resonator sections, a resonance line attenuation is created by the near field coupling, wherein the resonance line attenuation is determined by a complex refractive index of the sample (thus, by the absorption of the sample) at the frequency of the spectral resonance line of the resonator section. Accordingly, the resonance line attenuation at each of the detector units is a function of the sample absorption at the resonance line (resonance frequency) of the associated resonator section of the detector unit. Furthermore, the output of each of the sensor sections is determined by the resonance line attenuation of the associated resonator section, thus representing the sample absorption at the resonance line of the associated resonator section of the detector unit. A characteristic sample absorption signature (molecular fingerprint, e. g. spectrum) can be derived from the output of the sensor sections.

According to a second general aspect of the invention, the above objective is solved by a spectrometer apparatus for investigating a sample having an absorption within an infrared spectral range of interest. The spectrometer apparatus comprises a light source device, a detector device and a calculation device. The light source device is configured for generating measuring light with wavelengths in the infrared spectral range including at least one absorption band of the sample to be investigated. Preferably, the light source device comprises a broadband light source, in particular a thermal light source, e. g. a silicon carbide based source (globar). Alternatively, an array of at least two quantum cascade lasers can be used as a light source device.

The detector device has a plurality of detector units, each of which comprising at least one infrared sensitive sensor section and an associated dielectric, in particular non-metallic metamaterial resonator section, which has a specific spectral resonance line, preferably one single resonance line, within the infrared spectral range. The sensor sections preferably comprise micro-bolometer cells or mercury cadmium telluride (MCT) cells. Advantageously, micro-bolometer cells provide room temperature operation and high spatial resolution (see [21]). Preferably, the detector device can be arranged with an array of sensor sections, particularly preferred as a linear line or linear matrix array of the sensor sections, each being assigned to one associated resonator section. Advantageously, this allows an image processing based provision of the at least one absorption characteristic of the sample. The detector device is arranged for receiving the measuring light directed through the sample to the resonator sections and for subsequent sensing the measuring light by the sensor sections. An output of each of the sensor sections depends on the absorption of the sample at the frequency of the spectral resonance line of the associated resonator section.

The calculation device, like a computer circuit, is arranged for providing at least one absorption characteristic of the sample on the basis of the output of the sensor sections. Optionally, the calculation device can be included in a control device of the spectrometer apparatus.

According to the invention, the resonator sections are configured for accommodating the sample in such a configuration that near field coupling of electronic states of the sample and photonic resonator states of the resonator sections is provided. In particular, the spectrometer apparatus is free of a sample cuvette separating the sample from the detector device. The resonator sections are exposed for arranging the sample with such a distance from the resonator sections, that the near field coupling is provided. The near field coupling results in a resonance line attenuation of each of the resonator sections. The resonance line attenuation is determined by a complex refractive index of the sample at the frequency of the spectral resonance line of the resonator section. Furthermore, the sensor sections are arranged for providing the output which is determined by the resonance line attenuation of the associated resonator sections. Preferably, the spectrometer apparatus is configured for conducting the method according to the first general aspect of the invention.

The sample comprises any material, e. g. a pure substance or a mixture of substances, e.g. a mixture of molecules of interest (target analyte) and a suspension liquid. In particular, the sample is in a liquid or solid, surface adsorbed state at operation conditions of conducting the method of investigating the sample. Possible target analytes include e. g. molecules from biological organisms (biomolecules), polymers, environmental substances, or any liquids that can easily be brought into close, e. g. direct contact with the metasurfaces of the detector device. In particular, the sample may comprise a biological sample, e. g. biological cells and/or components thereof, like cell organelles or proteins or other biological macromolecules. Preferably, the sample comprises a deposited adsorbate on the resonator sections, directly on the resonator elements or on a cover intermediate layer thereof. The sample may have a thickness in a range below several µm, e. g. below 10 µm or below 5 µm, in particular below 300 nm, for instance below 100 nm, even down to molecular monolayers or sub-monolayers. Advantageously, strong coupling between resonator and analyte occurs up to analyte thicknesses of 300 nm due to the evanescent decay of the electromagnetic near fields. However, thicker samples can be provided onto the detector device, while only a certain fraction of the analyte close to the surface will be probed by the resonator sections.

According to the invention, the dielectric resonators elements do not act simply as optical filters, but provide the near field interaction between the resonator sections and the sample (analyte molecules) adjacent to them, e. g. surrounding them. Advantageously, the creation of near field coupling of the sample with the resonator sections allows an essentially increased sensitivity of sensing the spectral features of the sample compared with conventional filter based techniques, as described in [13] or [14], or with plasmonic techniques based on metallic resonators ([12]), which are inherently limited by intrinsic metal loss. The inventors have found that the near field coupling based resonance line attenuation is substantially stronger compared with conventional direct measurements of the sample absorption. The near field coupling provides an amplification (enhancement) of sensing the absorption of the sample, thus allowing the detection of small sample quantities. In other words, deposition of the sample, including a target analyte, on the detector unit metasurface (or an intermediate layer thereon) causes pronounced change in the transmission spectrum of the resonator sections, which is directly correlated with the enhanced absorptivity of the analyte molecules. This is due to the near field interaction between the analyte and the resonator section.

Furthermore, the inventors have found that metamaterial resonator sections are available, which have a single resonance frequency in the spectral range of interest, wherein the resonance frequency is tunable by the configuration of the resonator elements providing the resonator section, thus allowing a spectrally specific sensor section output. Contrary to proposed sensing applications of metasurfaces in prior art, e. g. in [8], the invention is based on the idea of employing one single resonance frequency per resonator section.

As a further advantage, the invention provides a spectroscopy method being capable of detecting mid-infrared molecular fingerprints without the need for light dispersive elements, frequency scanning, or moving mechanical parts, in particular without the need for an FTIR spectrometer. By a sufficient large number of detector units, an imaging-based spectroscopy is available, in particular employing a pixelated dielectric metasurface featuring ultra-sharp resonances each tuned to discrete frequencies, enabling a sampling of molecular absorption signatures at multiple spectral points and translating this information into a spatial absorption map for imaging. The invention allows to successfully detect signatures of e. g. biological, polymer, and pesticide molecules with high sensitivity, covering applications ranging from biosensing to environmental monitoring. The chemically specific technique of the invention redefines the boundaries of surface-enhanced molecular detection and in particular allows a miniaturized and/or chip-integrated mid-infrared spectroscopy.

Advantageously, due to the simultaneous detection at all detector units, in particular simultaneous image acquisition from all detector units, high throughput spectroscopic investigation, e. g. of biomolecules can be provided by the invention.

Preferably, the sample can be arranged in direct contact with the resonator sections, i. e. with exposed metasurface elements. Advantageously, this provides the maximum near field coupling of the sample and the resonator sections. Alternatively, the sample can be arranged with a distance from a resonator surface of the resonator sections. This can be obtained e. g. by providing an intermediate layer, like a dielectric protective layer on the resonator sections. The distance, e. g. the thickness of the intermediate layer, can selected in a range from above 0 nm, e. g. at least 1 nm, to 300 nm, preferably to 100 nm. As an example, for an implementation of a metasurface according to [1], numerical simulations show that the volume of strong resonator/analyte interaction extends vertically for 290 nm from the resonator surface (1/e decrease of electric field magnitude).

According to a first preferred embodiment of the invention, the sensor section and the associated resonator section of each detector unit can be coupled with each other, e. g. by direct connecting the resonator section with the sensor section or by providing any carrier structure coupling the sensor section and the associated resonator section (transmission configuration). In this case, the measuring light transmitted through the sample and trough the resonator sections is sensed by the sensor sections in transmission of the resonator sections. The transmission configuration can have advantages for improving the sensitivity of the inventive absorption measurement.

According to a second preferred embodiment of the invention, the sensor section and the associated resonator section of each detector unit can be arranged with a distance from each other and an imaging optic is provided for imaging each of the resonator sections onto one of the sensor sections (reflection configuration). In this case, the measuring light transmitted through the sample into the resonator sections is sensed by the sensor sections in reflection relative to the resonator sections. The sensor sections are arranged above the sample carrying side of the detector device. The reflection configuration can have advantages e. g. when the invention is implemented with a reflected-light microscope.

According to a further preferred feature of the invention, the resonator sections can be configured such that the resonance lines of the resonator sections have a lower linewidth, e. g. full width at half maximum (FWHM), compared with a narrowest absorption band expected in the sample absorption of the target analyte. Advantageously, this facilitates the reconstruction of an absorption signature, in particular an absorption spectrum, from the signal changes of individual detector units. Particularly preferred, the spectral resonance lines of the resonator sections can have a linewidth and/or frequency differences below 20% of an absorption band linewidth, in particular the narrowest absorption band width to be detected in the absorption of the sample. In quantitative examples, individual pixels of the dielectric sensor metasurface can be designed to exhibit ultra-sharp resonances with FWHM<50 nm in their transmission spectra. The frequency differences preferably are below 12 cm$^{-1}$, in particular below 4 cm$^{-1}$.

Preferably, the resonator sections can be configured such that they have a Q factor (quality factor) of at least 100, in particular at least 200. Advantageously, using the high Q-factor resonances offers a new dimension by selectively amplifying the spectroscopically rich molecular information at a specific spectral position. An improvement of more than one order of magnitude over antenna geometries based on gold nanostructures is obtained ([15], [16]).

According to a further advantageous embodiment of the invention, the resonator sections can be configured such the spectral resonance lines of the resonator sections are evenly distributed at equal frequency intervals within the infrared spectral range (uniform frequency sampling embodiment). Advantageously, this allows a direction translation of the output of the sensor sections to a linear frequency axis of an absorption spectrum. With a line-shaped, equidistant arrangement of the detector units, this embodiment of the invention allows a direct assignment of the detector unit positions to absorption frequencies and an image processing based assessment of the sensor section output signals.

According to a further embodiment of the invention, the resonator sections can be configured such the spectral resonance lines of the resonator sections are distributed at unequal frequency intervals within the infrared spectral range, e. g. for matching the resonator sections to specific absorption bands of the sample to be investigated (non-uniform frequency sampling embodiment). Advantageously, this allows the provision of a sample specific spectrometer apparatus having a reduced complexity. As an example, for detecting a sample having a certain number, e. g. two, absorption bands with specific amplitude ratios, employing this number, e. g. two, of detector units with resonator sections matched to the absorption bands would be sufficient for sensing the presence of the sample on the basis of the ratios of resonance line attenuation at the resonator sections. Alternatively or additionally, the spectral resolution of the absorption bands of interest can be increased by implementing the non-uniform frequency sampling. With this approach, denser frequency sampling can be employed in spectral regions with fine fingerprint features, whereas the molecular signature is sampled more broadly otherwise.

If according to another advantageous embodiment of the invention, detector units are combined such that the spectral resonance lines of at least one group of resonator sections have a common resonance frequency and an integrated output of the sensor sections associated with the at least one group of resonator sections is created, advantages in terms of sensitivity and improving the signal-to-noise ratio (SNR) are obtained. For providing at least one absorption characteristic of the sample on the basis of the output of the sensor sections, the output signals of combined detector units with a common resonance frequency are averaged to get an absorption value. Optionally, they can subjected to an additional calibration step for creating quantitative absorption values being comparable with absorption values provided by larger or smaller sized detector units. The resonator sections which belong to one group with a common resonance frequency can be arranged adjacent to each other or separated from each other in a detector field of view. Thus, as an additional advantage, sparse and redundant output signal representation techniques can be implemented to prevent localized defects from influencing the reconstruction of the absorption signal, for example, by including multiple detector units designed for the same resonance wavelength in different locations on the detector device.

Preferably, the size of the at least one group of resonator sections having the common resonance frequency is selected such that the larger an amplitude of an absorption band included in the absorption of the sample, the smaller is the size of the at least one group of resonator sections having the resonance frequency adapted to the absorption band, and vice versa. Advantageously, detection of weak molecular vibrations can be improved by utilizing groups of detector units with increased sizes for the frequencies of those molecular vibrations. Likewise, the size of groups of resonator sections with a common resonance frequency can be decreased for spectral regions of strong molecular absorption, thus optimizing the total number of detector units in the detector field of view.

According to a particularly preferred variant of employing combined detector units, multiple (at least two) different groups of detector units are provided each comprising a specific number of resonator sections with equal resonance frequencies. Advantageously, if the absorption of the sample includes at least one first absorption band and at least one second absorption band having an amplitude larger than the at least one first absorption band, a first group of resonator sections having an equal frequency at the at least one first absorption band is larger compared with a second group of resonator sections having an equal frequency at the at least one second absorption band.

According to another important advantage of the invention, multiple procedures of providing the at least one absorption characteristic of the sample are available, which can be implemented separately or in any combination. These procedures preferably are conducted by the calculation device of the spectrometer apparatus. According to a first variant, providing the at least one absorption characteristic of the sample can include detecting whether at least one predetermined substance of interest is contained in the sample or not. The absorption characteristic of the sample comprises a spectral distribution of the output signals of the sensor sections, which is compared with predetermined reference data of samples to be detected. The reference data are obtained from a reference measurement with a known sample and/or from numerical simulations. According to a second variant, providing the at least one absorption characteristic of the sample can include reconstructing at least one absorption spectrum of the sample. The absorption characteristic of the sample comprises the spectral distribution of the output signals of the sensor sections, which is directly converted to an absorption spectrum, e. g. by using calibration data from known absorption spectra. According to a third variant, providing the at least one absorption characteristic of the sample can include determining relative amplitudes of absorption bands of the sample.

According to a particularly preferred embodiment of the invention, the step of providing the at least one absorption characteristic of the sample can include creating a pixelated spatial output map (or: spatial absorption map) by the sensor sections, wherein each pixel value of the spatial output map represents the resonance line attenuation of the at least one associated resonator section and the at least one absorption characteristic of the sample is represented by the spatial output map. Preferably, each pixel value is calculated from integrated resonance lines with and without the sample. Advantageously, spectral information from a narrow wavelength range is mapped onto the spatial pixel arrangement. This encoded spectral information can then easily be retrieved using imaging processing without requiring an FTIR spectrometer.

Preferably, the spatial output map is compared with at least one reference map representing absorption characteristics of predetermined reference substance. For example, a library including reference maps of different reference substances can be provided. On the basis of this comparison, it is determined whether at least one reference substance is included in the sample under investigation. Alternatively or additionally, the spatial output map can be represented by a numerical matching algorithm as a linear combination of reference maps, and a mixing ratio of reference substances included in the sample under investigation is determined, preferably by linear decomposition of the spatial output map using the reference maps.

BRIEF DESCRIPTION OF THE DRAWINGS

Further advantages and details of the invention are described in the following with reference to the attached drawings, which schematically show in.

PREFERRED EMBODIMENTS OF THE INVENTION

Embodiments of the invention are described in the following with particular reference to a spectrometer apparatus with a matrix arrangement of detector units having metamaterial resonator sections with building blocks e. g. as disclosed in [1] or metamaterial resonator sections as described with reference to FIG. 2. It is emphasized that the invention is not restricted to these examples, but rather can be implemented with resonator sections having other types of dielectric metamaterial building blocks, e. g. as described in [7] or [8]. Details of designing and manufacturing the metamaterial resonator sections are not described as they are known per se. Resonance lines with a predetermined Q factor, line width and resonance frequency can be obtained by numerical simulations of the behaviour of metasurface elements in dependency on the number, materials, shape and size thereof.

Simulations of the metasurface optical response can be performed e. g. using the frequency domain finite element (FEM) Maxwell solver contained in the software CST STUDIO SUITE 2017, and the unit cell geometry of resonator elements can be approximated using a tetrahedral mesh. To demonstrate e. g. protein detection, the detector surface was covered with a 2.5 nm thick conformal model protein layer. The refractive index of this layer can be described using a 2-Lorentzian protein permittivity model with parameter values taken from [24].

Figure 1:
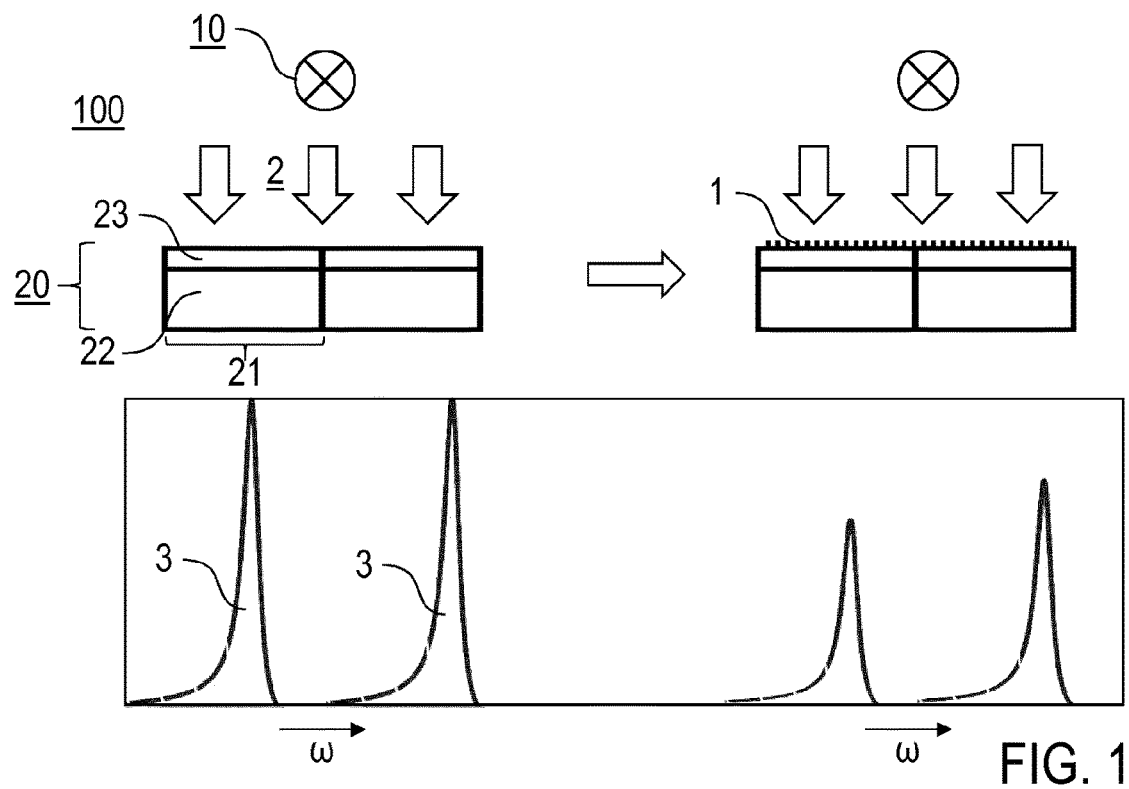
FIG. 1: the basic working principles of a spectrometer apparatus according to preferred embodiments of the invention.
Figure 3:
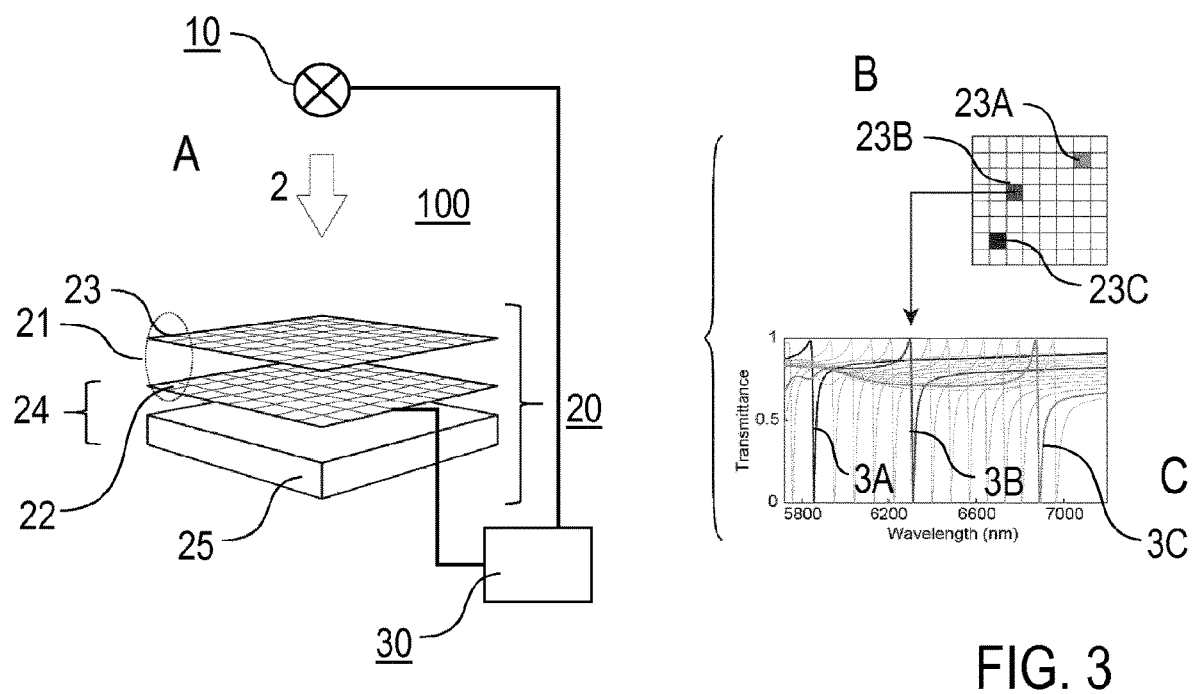
FIG. 3: another embodiment of the spectrometer apparatus being adapted for imaging-based spectroscopy with the transmission configuration.

Measuring the infrared absorption fingerprint of various analytes with an integrated nanophotonic sensor chip is described as an example (see in particular FIG. 3). The invention can be implemented with other arrangements of the metamaterial resonator sections. In particular, depending on the application of the invention, the spectrometer apparatus can include only two detector units (as shown in FIG. 1). Furthermore, exemplary reference is made to molecular fingerprint absorption measurements. The application of the invention is not restricted to these examples, but rather can be extended e. g. to other substances and/or substance detection based on absorption characteristics, like ratios of absorptions bands. Matrix arrangements of detector units are shown for illustrative purposes with e. g. 25 (5*5) or 64 (8*8) pixels. In practice, the invention can be implemented with more pixels, e. g. up to 128, 256 or even more, which can be arranged with square or other rectangular configuration or as a linear or curved row.

FIG. 1 schematically illustrates the basic working principles of a spectrometer apparatus 100 according to the invention. The spectrometer apparatus 100 includes a light source device 10, a detector device 20 and a calculation device (not shown in FIG. 1, see FIG. 3). The light source device 10 creates measuring light 2 including wavelengths in the mid-infrared spectral range. Optionally, the light source device 10 can be provided with an imaging optic distributing the measuring light 2 homogenously on the detector field of view. The detector device 20 comprises at least two detector units 21, each with an infrared sensitive sensor section 22 and an associated metamaterial resonator section 23. Each resonator section 23 comprises an array of resonator elements, e. g. as described with reference to FIG. 2. The resonator sections 23 have resonance lines 3 at different resonance frequencies. The resonance lines 3 may have same (as shown) or different amplitudes.

After deposition of the sample 1 on the metamaterial resonator sections 23 (right section of FIG. 1), the resonance lines 3 can be attenuated (as shown) or not, as it depends on the absorption of the sample 1 at the resonance lines 3. The resonance line attenuation at each of the resonator sections 23 is a function of the complex refractive index of the sample 1 at the frequency of the spectral resonance line 3 of the respective resonator section 23. The complex refractive index determines the spectral absorption of the sample 1. Due to near field coupling of electronic states of the sample 1 and photonic resonator states of the resonator sections 23, the amplitudes of the resonance lines 3 are reduced in a specific manner. The degree of resonance line attenuation directly can be converted to an optical absorption value at the resonance frequency of the respective resonator section 23. This conversion can be done on the basis of numerical simulations and/or calibration measurements with known samples. Without an absorption at the resonance frequency, there would be no coupling and no attenuation of the resonance line 3.

The output of the sensor sections 22 is a direct measure of the resonance line attenuation of the respective resonator section 23. The calculation device coupled with the sensor sections 22 provides at least one absorption characteristic of the sample 1 on the basis of the output of the sensor sections 22, e. g. a ratio of the attenuated resonance line amplitudes and/or a resonance line amplitude difference compared with the resonance line amplitudes before depositing the sample 1 on the resonator sections 23 and/or absolute resonance line amplitudes. As the absorption characteristic is a specific feature of the sample, e. g. the presence of a sample or the quantity of the sample can be derived from the output of the sensor sections 22.

Figure 2:
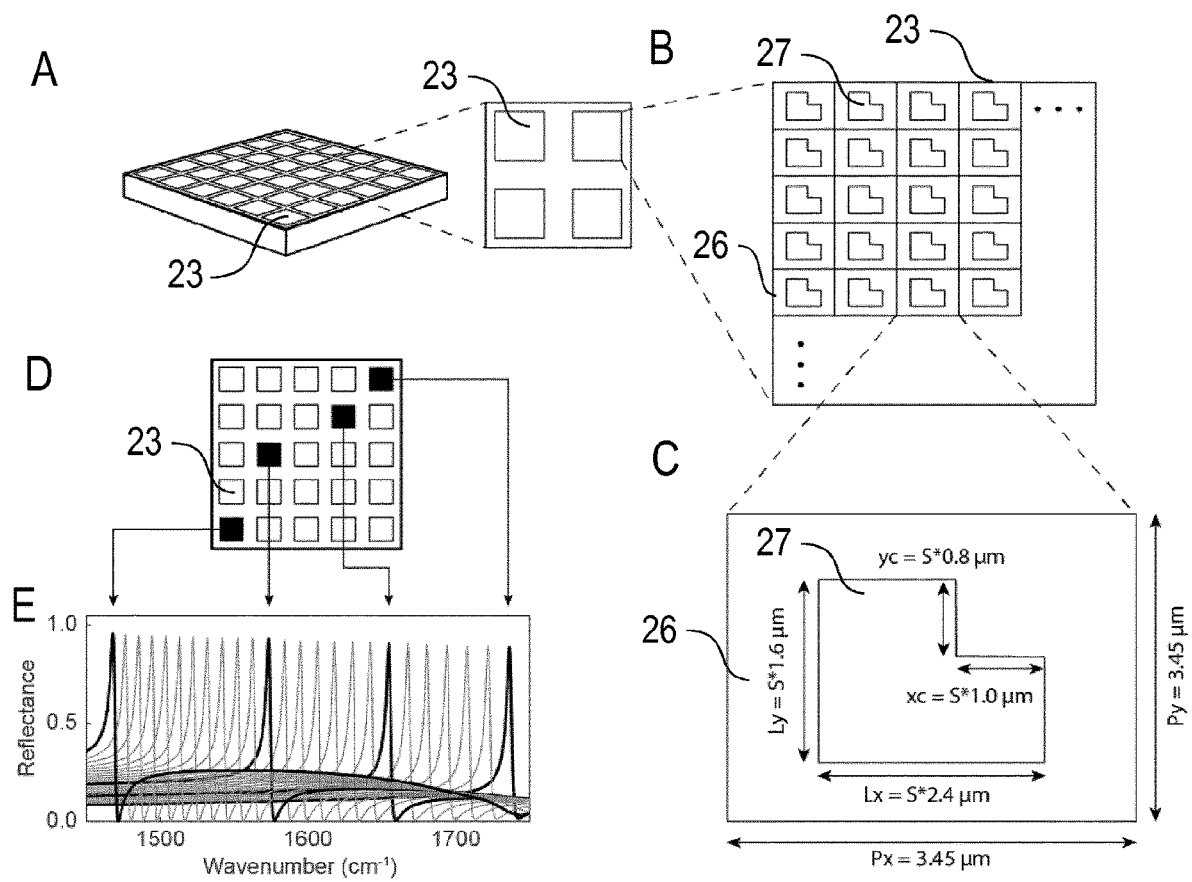
FIG. 2: an illustration of molecular fingerprint detection with a spectrometer apparatus having a matrix arrangement of metamaterial resonator sections providing a pixelated dielectric metasurface.

Instead of comprising only two detector units 21, a spectrometer apparatus preferably has a matrix arrangement of resonator sections 23 as shown in FIG. 2. Detector units including the metamaterial resonator sections 23 provide a pixelated detector metasurface as shown in FIGS. 2A and 2D. The resonator sections 23 are arranged as an array of 5*5 pixels, each with a side length of e. g. 100 μm. Each resonator section 23 comprises one array of resonator elements 27 as shown in FIG. 2B. For example, 50*50 resonator elements 27 (unit cells) provide one resonator section 23.

An example of a unit cell (one resonator element 27) and geometric parameters thereof is illustrated in FIG. 2C. The resonator element 27 comprises a building block with an L-shaped base area and a height H on a substrate 26. The resonator element 27 is made of e. g. amorphous silicon, while the substrate 26 is made of e. g. magnesium fluoride. The height of the resonators is fixed at e. g. H=1.0 μm. The resonance frequency of the resonator section 27 can be controlled by scaling the dimensions of the L-shaped building block with a factor S. The resonator elements 27 can be embedded in a covering dielectric intermediate layer (not shown), made of e. g. silicon dioxide with a thickness of e. g. 15 nm. The resonator elements 27 are created using e. g. electron-beam lithography and reactive ion beam etching.

Figure 4:
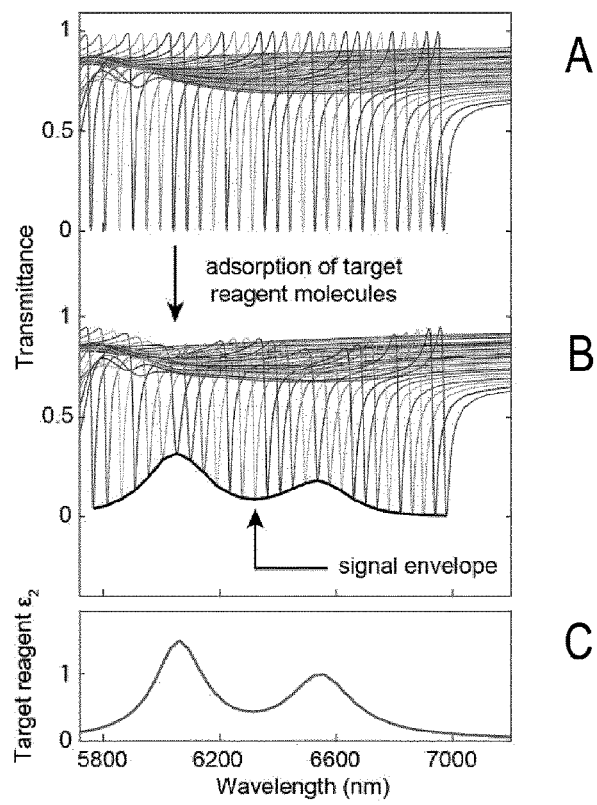
FIG. 4: an illustration of sensing an absorption characteristic of a sample.

FIGS. 2D and 2E show an exemplary arrangement of metasurface pixels designed to cover a target molecular fingerprint range, highlighting the one-to-one relationship between spectral and spatial information. FIG. 2E shows metapixel reflectance spectra of the resonator sections 23 obtained e. g. by numerically simulation, for different values of the scaling parameter S (see FIG. 2C), which is linearly interpolated from S=0.95 to S=1.25 in 25 steps. Each resonator section 23 has a specific location within the matrix arrangement of resonator sections 23 and a specific resonance frequency. Thus, the spatial information on the location of a resonator section 23 directly represents a resonance frequency, and a spatial map of output signals of sensor sections associated with the resonator sections directly represents an absorption signature of the sample, like a molecular fingerprint (see e. g. FIG. 4).

FIG. 2E shows that the inventive dielectric resonator section design is uniquely capable of providing metapixel resonance linewidths much narrower than the spectral feature size of e. g. amide I and II absorption bands. This is in strong contrast to metal based antennas used in SEIRA approaches [12]. Crucially, this conceptual advantage allows to sample protein absorption signature at multiple discrete frequency points and to translate this spectrally resolved absorption information into a code-like spatial map of the individual metapixel absorption signals (FIG. 2D). In combination with the broad-band mid-IR illumination and the two-dimensional imaging detector such one-to-one mapping between spectral and spatial information enables imaging-based fingerprint detection without any need of conventional FTIR spectrometry, frequency scanning, or moving mechanical parts.

FIG. 3 schematically illustrates the first embodiment of the spectrometer apparatus 100 (transmission configuration), wherein the detector device 20 includes an array of 8*8 detector units 21 (pixels). FIG. 3A is an exploded view of a preferred miniaturized and/or chip-integrated configuration for imaging-based molecular fingerprint detection. The spectrometer apparatus 100 includes the light source device 10, the detector device 20 and the calculation device 30, which is connected with the detector device 20 and optionally also with the light source device 10.

The detector device 20 comprises a pixelated dielectric metasurface being made of a matrix arrangement of resonator sections 23, e. g. as shown in FIG. 2, and being placed directly on top of a broadband mid-infrared imaging chip 24 (IR sensor array). The imaging chip 24 comprises an array of sensor sections 22, like micro-bolometers, on a common carrier substrate 25. The pixelated metasurface resonator sections 23 are integrated directly on top of the broadband imaging chip 24. As an example, a layer configuration of the resonator sections 23, including the resonator elements 27 on a common substrate (see FIG. 2) is bonded to the imaging chip 24. Each resonator section 23 is assigned to one of the sensor sections 22. Individual resonator sections 23 exhibit ultra-sharp resonances, which are spectrally tuned to cover a target wavelength range. Spectral information from a narrow wavelength range is mapped onto the spatial arrangement of the sensor sections 22, allowing straightforward readout via the broadband imaging chip 24.

The miniaturized and/or chip-integrated configuration of FIG. 3 requires the operation of the dielectric metasurface in transmission. Simulated transmission spectra for different scaling factors S (see FIG. 2C, linearly interpolated in 25 steps) are shown in FIG. 3C. Three spectral lines 3A, 3B and 3C are emphasized for illustrative purposes, which correspond to resonator sections 23A, 23B and 23C. The location of a resonator section in the pixel array directly represents a resonance frequency transmitted by the respective resonator section.

In operation, the detector device 20 is illuminated with broadband measuring light 2 from the light source device 10, like a globar source. Sample absorption induces a spectral attenuation of the transmission spectra of the resonator sections 23, which is directly read out from the imaging chip 24. Based on a calibration, reference data and/or a numerical simulation, the output signals of the imaging chip 24 are converted into absorption values. The data set of the absorption values is subjected to an envelope reconstruction algorithm for providing an approximating function which represents the absorption spectrum of the sample, as it is further illustrated in FIG. 4.

FIG. 4A shows the transmission spectra of a detector device 20 as shown in FIG. 3C. The adsorption of target reagent molecules on the resonator sections 23 induces a pronounced change in the transmittance response of the dielectric metasurface as shown in FIG. 4B. The envelope of the resonant features after adsorption is closely correlated with the imaginary part of the target reagent molecules' dielectric function ($\varepsilon_2$), enabling efficient reconstruction of the spectral absorption signature (FIG. 4C).

Advantageously, with the spectrometer apparatus 100 of FIG. 3A, an imaging-based and highly sensitive nanophotonic method is provided which is capable of detecting the mid-infrared molecular fingerprints of surface adsorbed molecules without the need for IR spectrometry, frequency scanning, or moving mechanical parts. Furthermore, the size of the spectrometer apparatus 100 can be minimized to dimensions of a microsystem chip. The invention leverages the pixelated metasurface composed of the 2D array of resonator sections 23, each with a nanostructured fields supporting high Q-factor resonances. The resonance positions of these individual metapixels preferably are engineered to amplify and detect molecular vibrations at multiple distinct frequency points spanning a target fingerprint range. With a preferred example, a linear variation of the resonance position is implemented and each resonance is assigned to a specific pixel of the metasurface, establishing a one-to-one mapping between spectral and spatial information (see e. g. FIGS. 2E, 3C and 5F). An imaging-based readout of this spatially encoded vibrational information provides a molecule-specific geometric code, enabling highly integrated chemical identification.

Figure 5:
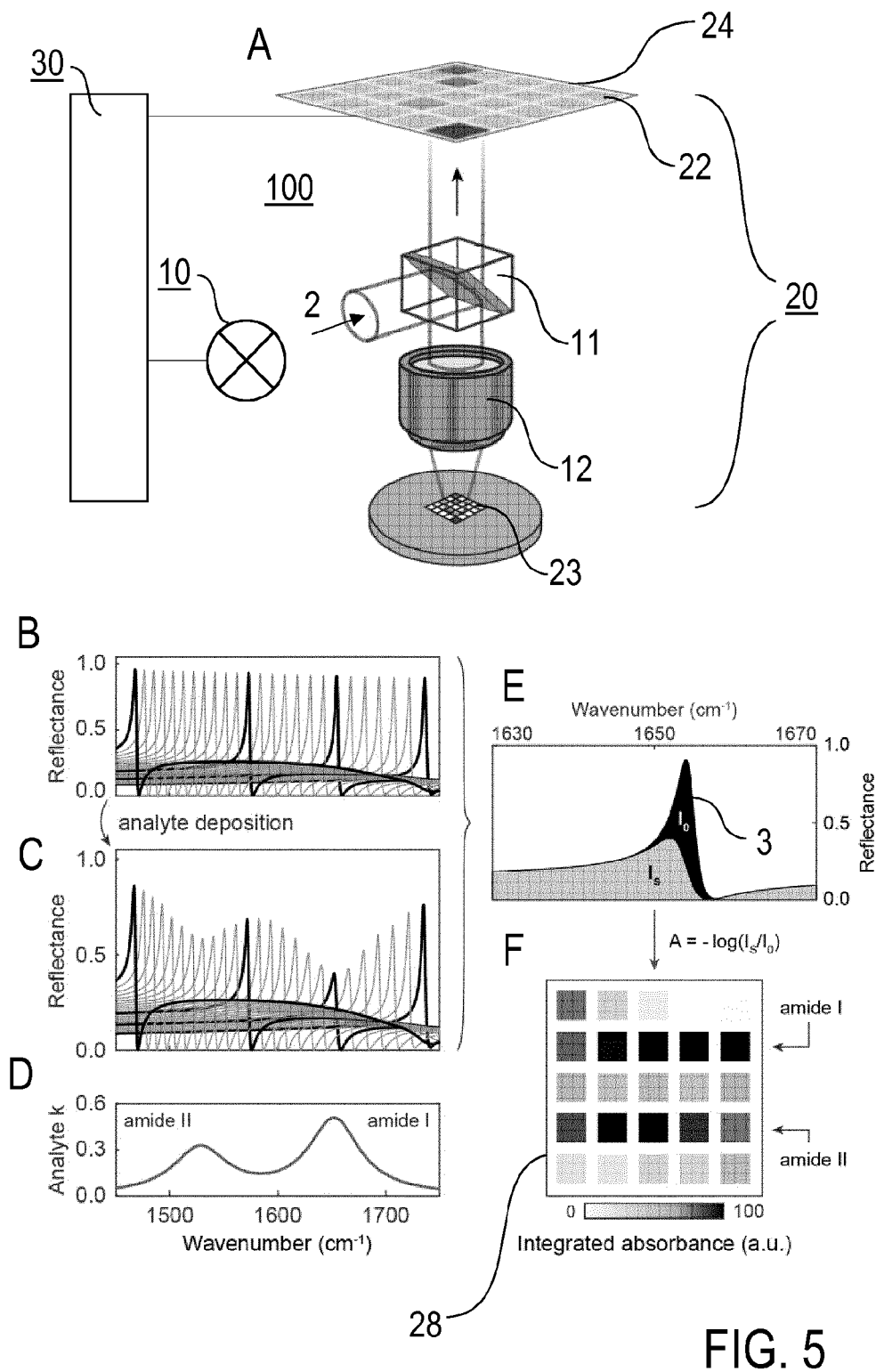
FIG. 5: another embodiment of the spectrometer apparatus being arranged with the reflection configuration.

FIG. 5 schematically shows features of the second embodiment of the spectrometer apparatus 100, wherein FIG. 5A is a sketch of a mid-IR microscopy configuration of the spectrometer apparatus 100 for imaging-based molecular fingerprint detection (reflection configuration). The spectrometer apparatus 100 is integrated into a microscope. The spectrometer apparatus 100 includes the light source device 10, the detector device 20 and the calculation device 30, which is connected with the sensor sections 22 of the detector device 20 and optionally also with the light source device 10. Detector units of the detector device 20 comprise resonator sections 23 and sensor sections 22 being arranged separately from each other. This embodiment has the reflection configuration, i. e. any resonance line attenuation is read out by mid-infrared imaging onto the imaging chip 24 above the sample carrying side of the resonator sections 23.

The measuring light 2 emitted by the light source device 10, like a thermal broadband source, is coupled via a semitransparent beam splitter 11 (transparency e. g. 50%) and an imaging optic 12, like a low numerical aperture objective, towards the array of resonator sections 23. The objective 12 allows to acquire the optical response of all metasurface pixels simultaneously. The resonator sections 23 provide a pixelated metasurface composed of high-Q resonant metapixels with resonance frequencies designed to cover a target molecular fingerprint range. Each resonator section 23 comprises a metasurface structure, e. g. as shown in FIG. 2B.

The resonator sections 23 are exposed for a deposition of a sample to be investigated. Preferably, the deposition is conducted, when the array of resonator sections 23 is positioned inside the spectrometer apparatus 100, e. g. inside the microscope. The array of resonator sections 23 can be provided as a sample support of the microscope. Alternatively, a prepared array of resonator sections 23 carrying the sample can be set into the spectrometer apparatus 100.

To demonstrate the versatility of the invention, the inventors measured and compared the spatial absorption maps of protein A/G, a mixture of the polymers polymethyl methacrylate (PMMA) and polyethylene (PE), and glyphosate herbicide, covering applications in fields as diverse as biosensing, materials science and environmental monitoring. In all three cases, the spatial absorption maps feature mutually distinct high intensity image regions unique to the vibrational signature of the investigated molecules, underscoring the chemical identification capability of the inventive method. With the practical example, for chemical identification measurements, the protein A/G was diluted in 10 mM acetate solution at 0.5 mg/mL concentration. The imaging chip 24 was incubated with the protein A/G solution to allow protein physisorption, followed by rinsing with deionized water to remove unbound protein and agglomerates. As another sample, glyphosate pesticide was diluted in deionized water at 5 mg/ml concentration and spin coated at 6000 rpm spin speed. For polymer investigations, e. g. polymethyl methacrylate (PMMA) with average molecular weight of 350,000 and medium density polyethylene (PE) were deposited by thermal evaporation. The deposition rate and layer thickness was measured with quartz crystal oscillator. Layer thickness for pure PMMA and PE were 10 nm and 40 nm, respectively.

The array of resonator sections 23 is imaged with the imaging optic 12 through the beam splitter 11 towards an array of sensor elements 22, like a broadband mid-infrared imaging chip 24. Via the imaging optic 12, each of the resonator sections 23 is assigned to one of the sensor sections 22. The output of the sensor sections 22 represents the reflectance of the resonator sections 23 and the possible resonance line attenuation induced by near field coupling with the sample. The spatial information of each sensor section 22 is directly related to the resonance frequency of the associated resonator section 23, so that the combined output signals and spatial information of the sensor sections 22 directly provides the absorption signature of the sample, as illustrated in FIGS. 5B to 5F.

With a practical example, a Spero laser-based spectral imaging microscope (Daylight Solutions Inc., San Diego, Calif., USA) was used for providing the configuration of FIG. 5A. For optically characterizing the resonance line of the resonator sections, quantum cascade laser heads can be used. For imaging, a low magnification objective 12 (4×, 0.15 NA) was used, which covers a large 2×2 mm² field of view (FOV) and delivers 24 µm diffraction limited spatial resolution at 1655 cm$^{-1}$. For a full description of the Spero microscopy system (see [25]). The optical measurements of the metapixel array were carried out in reflection mode and normalized to the reflection signal of a plain gold mirror. Measurements were performed e. g. in a spectral range from 1300 cm$^{-1}$ to 1800 cm$^{-1}$ with 0.5 cm$^{-1}$ spectral resolution. To address backscattering effects from the substrate, a background measurement is taken on an empty area of the imaging chip, spatially filtered to remove surface impurities, and subtracted from the metapixel array data.

FIG. 58 shows numerically simulated metapixel reflectance spectra before deposition of analyte molecules, and FIG. 5C shows the changed reflectance spectra after analyte deposition, which are modulated in correlation with the absorption fingerprint of the analyte molecules. As an example, FIG. 5D illustrates the imaginary part of the refractive index of a model analyte consisting of protein molecules. FIGS. 5E and 5F shows how the spectral integration of the individual resonance lines 3 before ($I_0$) and after ($I_s$) sample adsorption translates the reflectance spectra from FIGS. 5B and 5C into a 2D spatial output map 28 by spectrally integrating the spectra and calculating A=−log ($I_s/I_0$). The spatial output map 28 comprises pixels of grey scale values representing the calculated absorptions values A and providing the molecular code of the protein.

With an example, a sub-5 nm protein layer, modeled to cover the pixel array of resonator sections 23, causes a pronounced modulation of the individual metapixel reflectance spectra due to the coupling between the molecular vibrations and the enhanced electric near fields around the dielectric resonator sections 23. This reflectance modulation manifests as an attenuation and broadening of the metapixel resonance, which are correlated with the strength of the amide I and II molecular vibrations (FIG. 5D). Significantly, the envelope of the metapixel reflectance spectra unambiguously reproduces the protein absorption signature, confirming that the inventive pixelated metasurface configuration can perform efficient molecular fingerprint detection.

Figure 6:
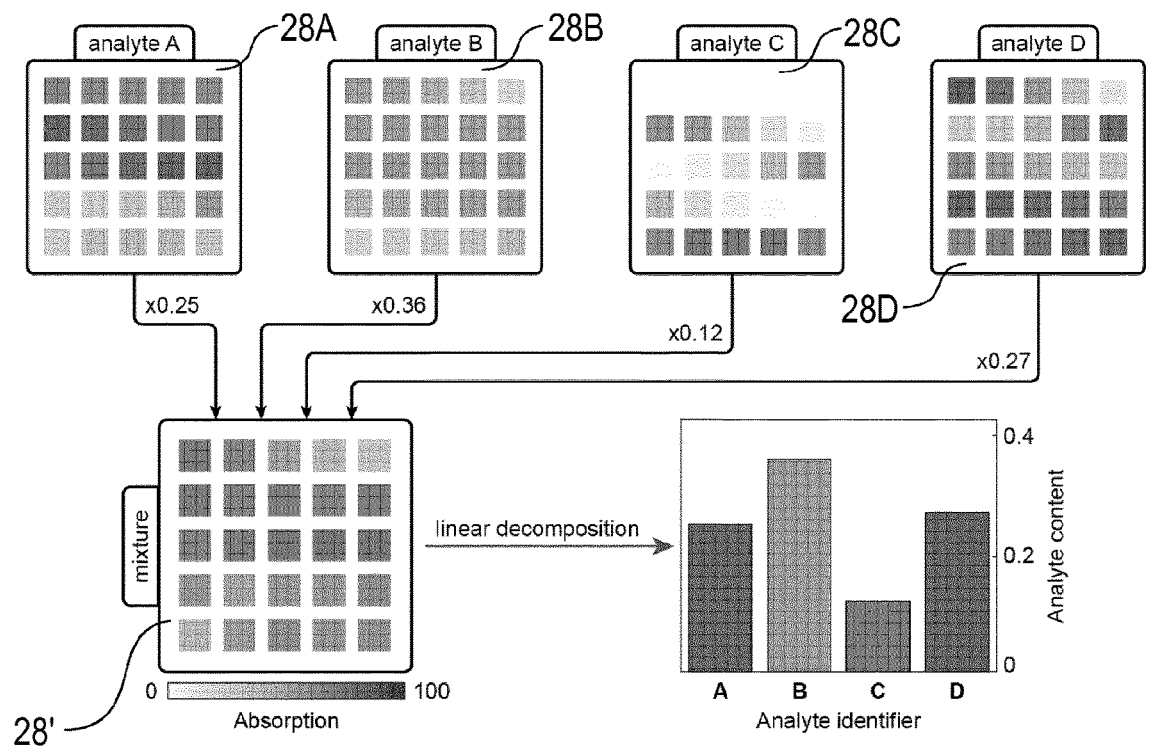
FIG. 6: an example of imaging-based chemical identification and composition analysis.

FIG. 5E presents a conceptual sketch of a molecule-specific geometric code (like a QR code) produced by imaging-based readout of the metasurface reflectance response. Image regions "amide 1" and "amide 2" indicate the spatially-encoded vibrational information from the corresponding metapixels in FIG. 5D. Thus, the result of the inventive method of investigating the sample can be obtained directly from the spatial output map 28, e. g. by the pixel signature thereof and/or by comparing the spatial output map 28 with a library of reference maps of predetermined reference substances. If the sample includes one single target analyte molecule, it can be identified by the equal reference map of the target analyte molecule. If the sample includes multiple target analytes, the composition of the sample can be obtained from the spatial output map 28 as illustrated in FIG. 6, which shows a procedure of linear decomposition for multi-analyte detection.

Chemical identification in mixtures containing multiple analytes is enabled through linear decomposition analysis based on a library of reference maps. For analyzing a mixture of target analytes, a spatial output map to be analyzed is considered as a linear combination of reference maps 28A, 28B, 28C and 28D of e. g. four different analyte molecules A to D (FIG. 6). A model spatial output map 28' is calculated by adding the reference maps 28A, 28B, 28C and 28D of the individual analytes A to D with predefined mixing ratios. By varying mixing ratios, the model spatial output map 28' is matched to the spatial output map to be analyzed. Even though the spatial output map of the mixture no longer displays the clear signatures of the constituent analytes, linear decomposition analysis is again able to effectively retrieve the correct relative analyte amounts. This decomposition analysis is not restricted to mixtures of four model analytes, but rather can be applied with binary or ternary mixtures or mixtures with increased number of analytes.

One of the preferred features of the invention is the spatial encoding and separation of spectral information. Therefore, the spectrometer performance is characterized by the number and size of individual resonator sections for a given detector field of view. Due to the flexibility of the resonator section design, advanced sampling techniques can be applied to further tailor signal-to-noise ratio and spectral coverage. Detector pixels with different sizes can be provided by the manufacturing process of the pixelated metasurface, e. g. by setting the size of an array of resonator elements having a predetermined resonance frequency or by creating a group of resonator sections including at least two arrays of resonator sections with equal sizes having the predetermined resonance frequency.

Figure 7:
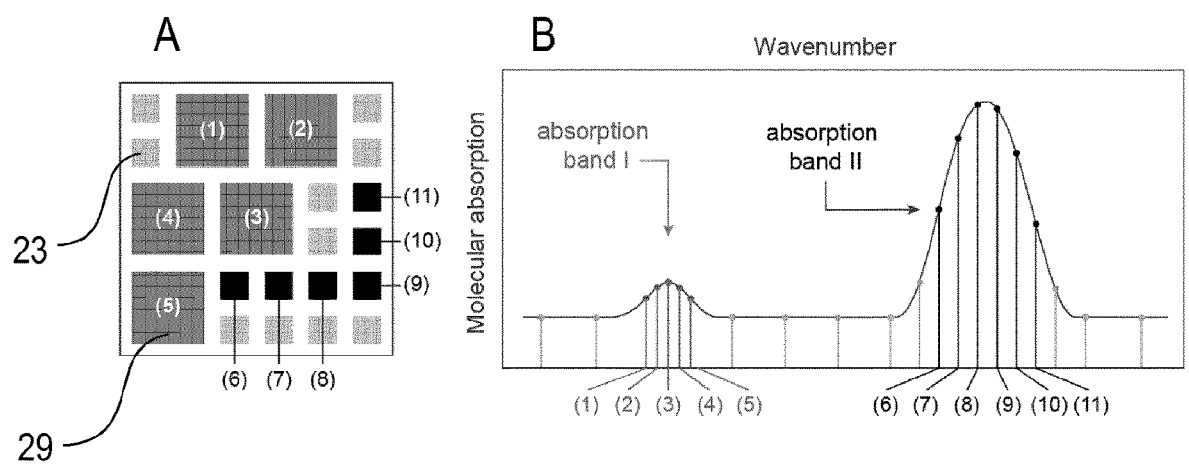
FIG. 7: a schematic illustration of an embodiment of the invention employing combined detector units with different pixel sizes.

FIG. 7 illustrates the latter embodiment of the invention, wherein the array of resonator sections 23, e. g. according to FIG. 2 or 3, includes e. g. five groups 29 of resonator sections 23 manufactured with equal resonance frequencies. The sensor sections associated with the resonator sections 23 of each group 29 of resonator sections are combined, i. e. the output signals of the sensor sections are integrated. The groups 29 of resonator sections 23 provide larger pixels compared with the single resonator sections 23. The resonance frequencies (1) to (5) of the large pixels are selected such that they cover a weak absorption band I of a target analyte, while the resonance frequencies (6) to (11) of the smaller pixels are selected such that they cover a strong absorption band II of the target analyte (see FIG. 7B). Thus, the retrieval of absorption signatures from weak molecular vibrations can be improved by utilizing pixels with increased sizes for frequency points covering the weak molecular vibrations, which results in higher signal-to-noise ratios. Likewise, pixel size can be decreased for spectral regions of strong molecular absorption, maximizing the total number of metapixels in the detector field of view. This embodiment allows an advanced sampling technique, having advantages when challenging molecular absorption signatures with large spectral separation and strongly dissimilar absorption magnitudes are to be resolved. The groups of resonator sections with equal resonance frequencies provide pixels with tailored sizes as well as non-uniform frequency sampling.

Alternatively or additionally, the spectral resolution of the absorption bands of interest can be increased by implementing non-uniform frequency sampling. With this embodiment, denser frequency sampling is employed in spectral regions with narrow absorption bands, whereas the molecular signature is sampled more broadly otherwise. This technique (as also illustrated in FIG. 7B) allows to increase the spectral fidelity of the fingerprint reproduction while keeping the total number of pixels constant.

Advantageously, the inventive technique redefines the prospects of infrared absorption spectroscopy by overcoming resonance linewidth limitations and the need for complex instrumentation. By harnessing the high-Q resonances of a pixelated dielectric metasurface, it is capable of translating molecular fingerprint information into an imaging-based molecular geometric code, enabling chemically specific and compositionally sensitive detection. Advantageously, a silicon-based pixelated metasurface design is fully compatible with industry standard complementary metal-oxide-semiconductor (CMOS) technology, allowing for the low-cost wafer-scale fabrication of sensor chips for practical applications. Going beyond simple linear regression techniques, the molecular geometric codes obtained with the inventive method offer unique possibilities for further analysis using neural network-based image recognition methods and deep learning ([22], [23]), paving the way towards versatile and highly sensitive chip-integrated mid-infrared spectroscopy devices.

The features of the invention disclosed in the above description, the drawings and the claims can be of significance both individually as well as in combination or sub-combination for the realization of the invention in its various embodiments.

The invention claimed is:

1. A method of investigating a sample having an absorption within an infrared spectral range of interest, comprising the steps of:
   creating measuring light with a light source device, wherein the measuring light includes wavelengths covering the infrared spectral range,
   directing the measuring light through the sample to a detector device with a plurality of detector units, each of which comprises an infrared sensitive sensor section and an associated metamaterial resonator section having a specific spectral resonance line, wherein spectral resonance lines of resonator sections have different frequencies within the infrared spectral range, wherein the measuring light is transmitted through the sample to the resonator sections and subsequently sensed by the sensor sections, wherein an output of each of the sensor sections depends on the absorption of the sample at a frequency of the spectral resonance line of the associated resonator section, and
   providing at least one absorption characteristic of the sample on the basis of the output of the sensor sections, wherein
   the sample is arranged for providing near field coupling of electronic states of the sample and photonic resonator states of the resonator sections, wherein, for each of the resonator sections, a resonance line attenuation is created, which is determined by a complex refractive index of the sample at the frequency of the spectral resonance line of the resonator section, and
   the output of each of the sensor sections is determined by the resonance line attenuation of the associated resonator section.

2. The method according to claim 1, including the step of providing the sample in direct contact with the resonator sections.

3. The method according to claim 1, including the step of providing the sample with a distance from a resonator surface of the resonator sections, said distance being selected in a range from above 0 nm to 300 nm.

4. The method according to claim 1, wherein the sample comprises biological cells or components thereof.

5. The method according to claim 1, wherein
the sensor section and the associated resonator section of each detector unit are coupled with each other, and
the measuring light transmitted through the sample and the resonator sections is sensed by the sensor sections in transmission relative to the resonator sections.

6. The method according to claim 1, wherein
the sensor section and the associated resonator section of each detector unit are arranged with a distance from each other, wherein an imaging optic is arranged for imaging each of the resonator sections onto one of the sensor sections, and
the measuring light transmitted through the sample and the resonator sections is sensed by the sensor sections in reflection relative to the resonator sections.

7. The method according to claim 1, wherein
each resonator section is designed such that the specific spectral resonance line is the only resonance line of the resonator section within the infrared spectral range.

8. The method according to claim 1, wherein
the spectral resonance lines of the resonator sections have at least one of a linewidth difference and a frequency difference below 20% of an absorption band linewidth included in the absorption of the sample.

9. The method according to claim 1, wherein
the resonator sections have a quality factor of at least 100.

10. The method according to claim 1, wherein
the spectral resonance lines of the resonator sections are evenly distributed at equal frequency intervals within the infrared spectral range.

11. The method according to claim 1, wherein
the spectral resonance lines of the resonator sections are matched to specific absorption bands of the sample to be investigated.

12. The method according to claim 1, wherein
the spectral resonance lines of at least one group of resonator sections have an equal resonance frequency, and
a combined output of the sensor sections associated with the at least one group of resonator sections is created.

13. The method according to claim 12, wherein
a size of the at least one group of resonator sections is selected such that the larger an amplitude of an absorption band included in the absorption of the sample, the smaller is the size of the at least one group of resonator sections having the resonance frequency adapted to the absorption band, and vice versa.

14. The method according to claim 12, wherein
the absorption of the sample includes at least one first absorption band and at least second first absorption band having an amplitude larger than the at least one first absorption band, and
a first group of resonator sections having an equal frequency at the at least one first absorption band is larger compared with a second group of resonator sections having an equal frequency at the at least one second absorption band.

15. The method according to claim 1, wherein
the infrared spectral range of interest is a range comprising or being included in a frequency interval from 7000 cm$^{-1}$ to 650 cm$^{-1}$.

16. The method according to claim 1, wherein
the sample comprises a biological sample.

17. The method according to claim 1, wherein the step of providing at least one absorption characteristic of the sample includes at least one of
detecting whether at least one predetermined substance of interest is included in the sample,
providing at least one absorption spectrum of the sample, and
determining relative amplitudes of absorption bands of the sample.

18. The method according to claim 1, wherein the step of providing at least one absorption characteristic of the sample includes the step of
creating a pixelated spatial output map of the sensor sections, wherein
each pixel of the spatial output map represents the resonance line attenuation of the associated resonator section, and
the at least one absorption characteristic of the sample is represented by the spatial output map.

19. The method according to claim 18, including the steps of
comparing the spatial output map with a plurality of reference maps each representing absorption characteristics of predetermined reference substances, and
determining whether at least one reference substance is included in the sample under investigation.

20. The method according to claim 18, including the steps of
representing the spatial output map as a linear combination of reference maps, and
determining a mixing ratio of reference substances included in the sample under investigation.

21. A spectrometer apparatus, being configured for investigating a sample having an absorption within an infrared spectral range of interest, comprising:
a light source device being arranged for creating measuring light including wavelengths, which cover the infrared spectral range, and
a detector device with a plurality of detector units, each of which comprises an infrared sensitive sensor section and an associated metamaterial resonator section having a specific spectral resonance line, wherein spectral resonance lines of resonator sections have different frequencies within the infrared spectral range, wherein
the detector device is arranged for receiving the measuring light directed through the sample to the resonator sections and for subsequent sensing the measuring light by the sensor sections, wherein an output of each of the sensor sections depends on the absorption of the sample at a frequency of the spectral resonance line of the associated resonator section, and
a calculation device being arranged for providing at least one absorption characteristic of the sample on the basis of the output of the sensor sections, wherein
the resonator sections are arranged for accommodating the sample such that near field coupling of electronic states of the sample and photonic resonator states of the resonator sections is provided, wherein the near field coupling is capable of creating a resonance line attenuation of each of the resonator sections, which is determined by a complex refractive index of the sample at the frequency of the spectral resonance line of the resonator section, and
the sensor sections are arranged for providing the output which is determined by the resonance line attenuation of the associated resonator section.

22. The spectrometer apparatus according to claim 21, wherein
the resonator sections are arranged for accommodating the sample in direct contact with the resonator sections.

23. The spectrometer apparatus according to claim 21, wherein
the resonator sections carry a transparent intermediate layer arranged for accommodating the sample, wherein the intermediate layer has a thickness selected in a range from above 0 nm to 300 nm.

24. The spectrometer apparatus according to claim 21, wherein
the sensor section and the associated resonator section of each detector unit are coupled with each other, and
the detector device is arranged for sensing light transmitted through the sample and the resonator sections by the sensor sections in transmission relative to the resonator sections.

25. The spectrometer apparatus according to claim 21, wherein
the sensor section and the associated resonator section of each detector unit are arranged with a distance from each other, wherein an imaging optic is arranged for imaging each of the resonator sections onto one of the sensor sections, and
the detector device is arranged for sensing light transmitted through the sample and the resonator sections by the sensor sections in reflection relative to the resonator sections.

26. The spectrometer apparatus according to claim 21, wherein
each resonator section is designed such that the specific spectral resonance line is the only resonance line of the resonator section within the infrared spectral range.

27. The spectrometer apparatus according to claim 21, wherein
the spectral resonance lines of the resonator sections have a linewidth and/or frequency differences below 20% of an absorption band linewidth included in the absorption of the sample.

28. The spectrometer apparatus according to claim 21, wherein
the resonator sections have a Q factor (quality factor) of at least 100.

29. The spectrometer apparatus according to claim 21, wherein
the spectral resonance lines of the resonator sections are evenly distributed at equal frequency intervals within the infrared spectral range.

30. The spectrometer apparatus according to claim 21, wherein
the spectral resonance lines of the resonator sections are matched to specific absorption bands of the sample to be investigated.

31. The spectrometer apparatus according to claim 21, wherein
the spectral resonance lines of groups of resonator sections have an equal resonance frequency, and
the associated sensor sections are arranged for creating a combined output.

32. The spectrometer apparatus according to claim 21, wherein
the light source device is arranged for creating the measuring light including wavelengths in the infrared spectral range of interest, which is a range comprising or being included in a frequency interval from 7000 cm$^{-1}$ to 650 cm$^{-1}$.

33. The spectrometer apparatus according to claim 21, wherein the calculation device is arranged for providing the at least one absorption characteristic of the sample by at least one of
detecting whether at least one predetermined substance of interest is included in the sample,
providing at least one absorption spectrum of the sample, and
determining relative amplitudes of absorption bands of the sample.

34. The spectrometer apparatus according to claim 21, wherein the calculation device is arranged for providing the at least one absorption characteristic of the sample by
creating a pixelated spatial output map of the sensor sections, wherein each pixel of the spatial output map represents the resonance line attenuation of the associated resonator section, and
the at least one absorption characteristic of the sample is represented by the spatial output map.

35. The spectrometer apparatus according to claim 34, wherein the calculation device is arranged for
comparing the spatial output map with a plurality of reference maps each representing absorption characteristics of specific reference substances, and
determining whether at least one reference substance is included in the sample under investigation.

36. The spectrometer apparatus according to claim 34, wherein the calculation device is arranged for
representing the spatial output map as a linear combination of reference maps, and
determining a mixing ratio of reference substances included in the sample under investigation.

37. The spectrometer apparatus according to claim 21, wherein
the light source device comprises a broadband light source.

38. The spectrometer apparatus according to claim 37, wherein
the broadband light source comprises a thermal light source.

39. The spectrometer apparatus according to claim 38, wherein
the thermal light source comprises a silicon carbide based source (globar).

40. The spectrometer apparatus according to claim 21, wherein
the detector units are arranged as a linear array of sensor sections.

41. The spectrometer apparatus according to claim 40, wherein
the detector units are arranged as a linear matrix array of the sensor sections.

42. The spectrometer apparatus according to claim 21, wherein
the sensor sections comprise an array of micro-bolometer cells or a mercury cadmium telluride (MCT) focal plane array.

* * * * *